United States Patent [19]
Anderson

[11] Patent Number: 5,999,291
[45] Date of Patent: Dec. 7, 1999

[54] CENTRALIZED WAVELENGTH DISTRIBUTION FOR WAVELENGTH DIVISION MULTIPLEXED SYSTEMS

[75] Inventor: Gordon Emory Anderson, Forest Hills, N.Y.

[73] Assignee: Telcordia Technologies, Inc., Morristown, N.J.

[21] Appl. No.: 09/088,977

[22] Filed: Jun. 2, 1998

[51] Int. Cl.[6] .................................................. H04J 14/02
[52] U.S. Cl. ......................... 359/133; 359/124; 359/130; 359/174
[58] Field of Search .................................... 359/124, 127, 359/130, 133, 174

[56] References Cited

PUBLICATIONS

Karasan et al., "Optical Restoration at the Wavelength–Multiplex–Section Level in WDM Mesh Networks", IEEE Photonics Technology Letters, vol. 10, No. 9, Sep. 1998. pp. 1343–13–45.

Kojucharow et al., "A Wireless Lan At 60 GHZ– Novel System Design and Transmission Experiments", Microwave Symposium Digest, 1998 IEEE MTT–S International, vol. 3, Jun. 7, 1998, pp. 1513–1516.

Primary Examiner—Kinfe-Michael Negash
Attorney, Agent, or Firm—Orville R. Cockings

[57] ABSTRACT

A combination and method for centralized distribution of laser carrier beams to collocated wavelength division multiplexing systems divide and couple the optical carrier beam from high power laser sources to each of more than one collocated system. The carrier beam is then modulated by modulators in transponders residing in each wavelength division multiplexing system. Each modulated signal is then combined by a wavelength division multiplexer for transmittal onto an output fiber.

20 Claims, 2 Drawing Sheets

CENTRALIZED WAVELENGTH DISTRIBUTION FOR WAVELENGTH DIVISION MULTIPLEXED SYSTEMS

FIELD OF THE INVENTION

This invention is related to Wavelength Division Multiplexed (WDM) systems and more specifically to providing the laser carrier beams for a plurality of collocated WDM system from centralized laser sources.

BACKGROUND OF THE INVENTION

In 1984 the American National Standards Institute (ANSI) T1 Committee promulgated the Synchronous Optical NETwork (SONET) standard in ANSI document T1.105. The SONET standard essentially added new digital data rates to the North American digital hierarchy above the digital data rate of 44,736,000 b/s (44.736 Mb/s), which, at the time, was the highest digital data rate deployed. The new SONET digital data rates began at approximately 52 Mb/s, the STS/OC-1 rate, and extended up to approximately 2,500,000,000 b/s (2.5 Gb/s), the STS/OC-48 rate, i.e., 48 times the STS/OC-1 rate. Since that time ANSI has further extended the North American digital hierarchy up to approximately 10 Gb/s, STS/OC-192. Although discussions have taken place in the ANSI committees regarding increasing the SONET digital hierarchy up to 40 Gb/s, an increase to 40 Gb/s may be years away because of economic and technical issues. Thus, 10 Gb/s may be a real upper bandwidth limit for some time to come up. In addition, SONET transport systems are limited to fiber spans having maximum lengths of 40 kilometers (40 km) or 25 miles.

Despite the availability of these relatively large bandwidth transport pipes network service providers have nonetheless been demanding the capability to carry even larger amounts of data over fiber spans having a reach of more than 25 miles. The higher demand is primarily attributable to the accelerating pace of traffic growth in the inter-exchange carrier networks. The traffic growth has been dominated by the growth in data traffic. This data traffic growth is also beginning to creep into the local exchange network causing similar network exhaustion problems. Fiber exhaustion in the local exchange network may also be attributed to the increasing demand for internet access, and support of broadband technologies such as Digital Subscriber Loop and 100 Mb/s Ethernet. In any event, the higher traffic demand has exhausted the capacity of the inter-exchange and local interoffice fiber plant at a time when new fiber installations are effectively prohibited by cost and right of way concerns.

Wavelength Division Multiplexed (WDM) technology has developed as the solution to the fiber plant exhaustion problems described above. WDM systems differ from traditional time division multiplexed fiber systems, e.g., SONET systems, in that in lieu of requiring faster time division multiplexing electronics modulating fast lasers, WDM systems multiplex the individual signals from pulse amplitude modulated systems onto one fiber by assigning each pulse amplitude signal a specific wavelength. For example, several "lower speed input" OC-48 signals may each enter a WDM system as a pulse amplitude modulated 1310 nanometer (nm) laser signal. Each OC-48 signal is then assigned or transposed to a specific wavelength or channel in the 1550 wavelength band, for example, a 1553 nm signal at a rate of at least 2.5 Gb/s. The wavelength conversion is typically performed by a device called a wavelength converting transponder. Each channel or wavelength requires one transponder. After wavelength conversion each individual channel or wavelength is then multiplexed by a wavelength division multiplexer and coupled onto the same fiber. By this method a WDM system may transmit several OC-48 signals onto the same fiber. This results in tremendous cost savings in that each pulse amplitude modulated OC-48 signal transmitted would otherwise require a separate fiber and additional electronics. WDM technology essentially solves the fiber exhaustion and cost problems by increasing the capacity of the fiber without requiring the installation of new fiber. In fact each wavelength carried by a WDM system may be considered a virtual fiber.

WDM systems while providing great cost savings are nonetheless fairly expensive and are proving costly to maintain. One of the major factors contributing to the high maintenance costs of WDM systems is the fact that current WDM systems require a different transponder for each channel. Thus, a service provider has to maintain and track an inventory of incompatible transponders in the event an in-service transponder fails. As such, maintenance costs rise in proportion to the number of channels in a system.

A transponder typically has an optical to electric converter (O/E converter), a laser, and in most cases an external modulator, e.g., lithium niobate modulator. The lower speed input signals entering a WDM system are coupled to the O/E converter on the transponder and converted to an electrical signal. The electrical signal may then be used to directly modulate the laser on the transponder. On the other hand, for WDM systems having external modulators the electrical signal is then used to modulate the external modulator as the continuous wave laser or carrier beam is coupled through the external modulator. The laser on the transponder is typically a distributed feedback (DFB) laser operating in the 1550 nm band. These lasers are required to meet certain guard band requirements critical to the operation of a WDM system. These requirements stem from bandwidth channel limitations. That is, there is some limited range within the 1550 nm wavelength band wherein transmission is feasible. Thus, the more channels the tighter the guard band requirements. For example, ITU Draft Recommendation G.629 recommends a channel spacing of 100,000,000,000 Hz or approximately 0.78 nm for a WDM system having eight or more channels. Furthermore, the laser residing on the transponder has to be stable in order to be kept within the guard band. As such, DFB lasers having narrow linewidths are required. Furthermore, these DFB lasers are usually monitored by costly electronics to maintain their stability. Thus, transponders are costly items.

As such, the more channels and consequently the more transponders employed per WDM system the greater the costs associated with purchasing and maintaining these systems. For example, a forty channel WDM system requires forty transponders, one for each wavelength. Furthermore, a service location having ten forty channel WDM systems would require maintaining and tracking four hundred transponders. Moreover, transponders cannot be shared among different WDM system suppliers. Of great utility, then, would be a generic transponder, able to be placed into operation for any wavelength and capable of being shared among different WDM systems.

Wavelength tunable lasers have been considered as replacements for DFB lasers. Under such a scheme a transponder having a tunable laser could be used for several channels within a WDM system. Tunable lasers, however, cost more than DFB lasers and would require even more costly electronics to be resident on the transponder. Thus, the costs associated with using tunable lasers are currently prohibitive. Furthermore, tunable multi-channel lasers are not yet commercially available.

SUMMARY OF THE INVENTION

My invention is a system in which the individual laser sources provide optical carrier beams which are distributed by optical splitters to more than one collocated WDM system. This novel aspect of my invention is based on the realization that it is not necessary for an externally modulated laser source to reside on the transponder along with the external modulator. Thus, WDM systems deployed in accordance with my invention would realize significant cost savings.

Although WDM systems are currently being deployed at a rapid rate, typically only one WDM system resides at a service provider location or office; current expectations are for the deployment of multiple WDM systems in a single office within the next several years. In fact, WDM suppliers have already unveiled products where more than one collocated WDM system is in the same office. Furthermore, local exchange carriers have also unveiled plans to have WDM hubs in the local exchange network. With the deployment of multiple WDM systems within a single office my invention allows a service provider to create a common support structure for what would otherwise appear as a multiple supplier multiple WDM system environment. A service provider employing my invention will realize a significant reduction in cost because operation support systems can be deployed as if supporting a single network element. Furthermore, such a monolithic system would use common cards to support what would have been separate cards on multiple network elements.

In one aspect of my invention a centralized bank of up to forty laser diodes provides the wavelengths, channels or optical carrier beams for up to ten collocated WDM systems. This aspect of my invention is achieved by dividing and transmitting each laser diode optical carrier beam to each collocated WDM system. The optical carrier beams are then equalized, as by an attenuator, before being coupled to a corresponding transponder. Each corresponding transponder converts each low speed input to an electrical equivalent and modulates the laser diode optical carrier beam using the electrical equivalent signal thereby transposing the low speed input to a signal operating at the wavelength of the optical carrier beam. The optical carrier beam is then combined via wavelength division multiplexing with the other system channels, amplified and transmitted onto a fiber.

In another aspect of my invention the laser diode optical carrier beams are divided and transmitted to the collocated WDM systems wherein the signal first traverses a Bragg grating. The optical carrier beams are then equalized before being coupled to a corresponding transponders. Each optical carrier beam coupled to a transponder is routed through an external modulator wherein the optical carrier beam is modulated by the electrical equivalent of the low speed channel input thereby transposing the low speed channel to a signal operating at the wavelength of the optical carrier beam. The optical carrier beam is then combined via wavelength division multiplexing with the other system channels and transmitted onto a fiber without any further amplification. A system designed in accordance with this aspect of my invention does not require optical power amplifiers after the wavelength division multiplexer.

In another aspect of my invention the laser diode optical carrier beams are divided and transmitted directly to the collocated low speed SONET or other channel transmitter wherein each low speed channel is transposed by an external modulator to the laser diode optical signal. The transposed output of each low speed channel is then coupled to a corresponding dumb transponder residing on each collocated WDM system wherein each channel is equalized and combined via wavelength division multiplexing. Dumb transponders, such as those designed in accordance with this aspect of my invention, would not include either a O/E converter or a modulator. The combined signal is then amplified and transmitted onto a fiber. A WDM system designed in accordance with this aspect of my invention has the additional advantage of further eliminating one receiver and one laser per WDM channel.

A wavelength division multiplexing system implemented in accordance with my invention results in cost savings as channel laser diodes are shared among more than one wavelength division multiplexing system.

BRIEF DESCRIPTION OF THE DRAWINGS

These and other advantageous features of my invention can be understood from the following detailed description together with the accompanying drawings, in which.

DETAILED DESCRIPTION

Figure 1:
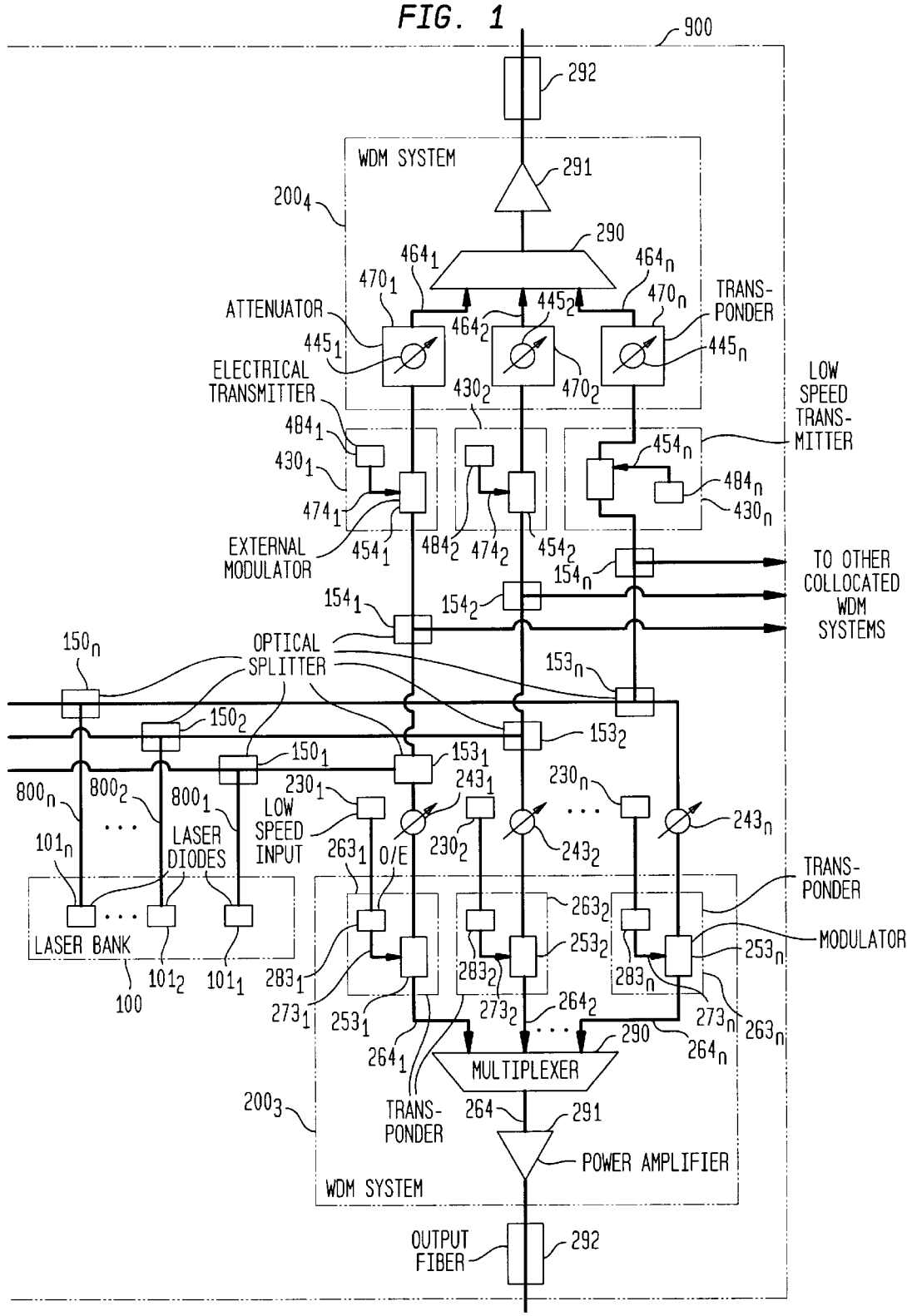
FIGS. 1 and 2, when placed adjacent to each other, depict an illustrative embodiment of my invention including a bank of lasers centrally distributed to four WDM systems.

Turning now to FIG. 1, there is illustratively depicted a bank of lasers 100 centrally distributing wavelengths or channels 800 to two collocated wavelength division multiplexing (WDM) systems 200. Laser bank 100 is a shelf housing a plurality of laser diodes 101. The number of laser diodes 101 residing in laser bank 100 is dependent on the number of wavelengths or channels 800 that WDM systems 200 are capable of supporting. For example, if a WDM supports forty channels $800_1$ through $800_{40}$ then laser bank 100 would include forty laser diodes $101_1$ through $101_{40}$, respectively. Each laser diode 100 emits an output signal or a carrier beam and each carrier beam comprises a channel 800 in the WDM system. Thus, each laser output signal or carrier beam corresponds to a channel and for the remainder of this specification wavelengths, channels, laser output signals, and carrier beams are regarded as synonyms and used interchangeably. As laser diode signals or optical carrier beams 800 are emitted from laser bank 100 they are split or divided by an optical splitter 150. For example, laser diode signal $800_1$ is split at optical splitter $150_1$. One of the two outputs of optical splitter $150_1$ is then fed to optical splitters $153_1$ which similarly splits the signal $800_1$ received thereat. The other output of splitter $150_1$ is fed to splitter $152_1$ as illustrated by placing FIG. 1 and FIG. 2 side by side. One output of splitter $153_1$ is coupled to WDM system $200_3$ while the other output is coupled to WDM system $200_4$.

That portion of signal $800_1$ coupled to WDM system $200_3$ by splitter $153_1$ is first coupled to an attenuation or gain control device $243_1$. The signal $800_1$ is then applied to a transponder $263_1$ residing in WDM system $200_3$. As the signal $800_1$ enters transponder $263_1$, the signal $800_1$ is applied to external modulator $253_1$ and is amplitude modulated by an electrical input $273_1$. Electrical input $273_1$ is the electrical equivalent of the signal transmitted by a low speed input $230_1$, such as a SONET signal, and is derived by an optical to electrical converter $283_1$ residing in transponder $263_1$. The output of modulator $253_1$ and transponder $263_1$ is signal $264_1$ which is the wavelength transposed representation of the optical signal transmitted by low speed input $230_1$. Signal $264_1$ is transmitted to wavelength division multiplexer 290 where it is spectrally combined with the signals $264_2$ through $264_n$ received from transponders $263_2$ through 263ₙ, each signal 264 representing a different low speed input 230 and channel 800 in a WDM system. Signal 264 is applied to an optical fiber amplifier 291 and coupled onto output fiber 292.

Figure 2:
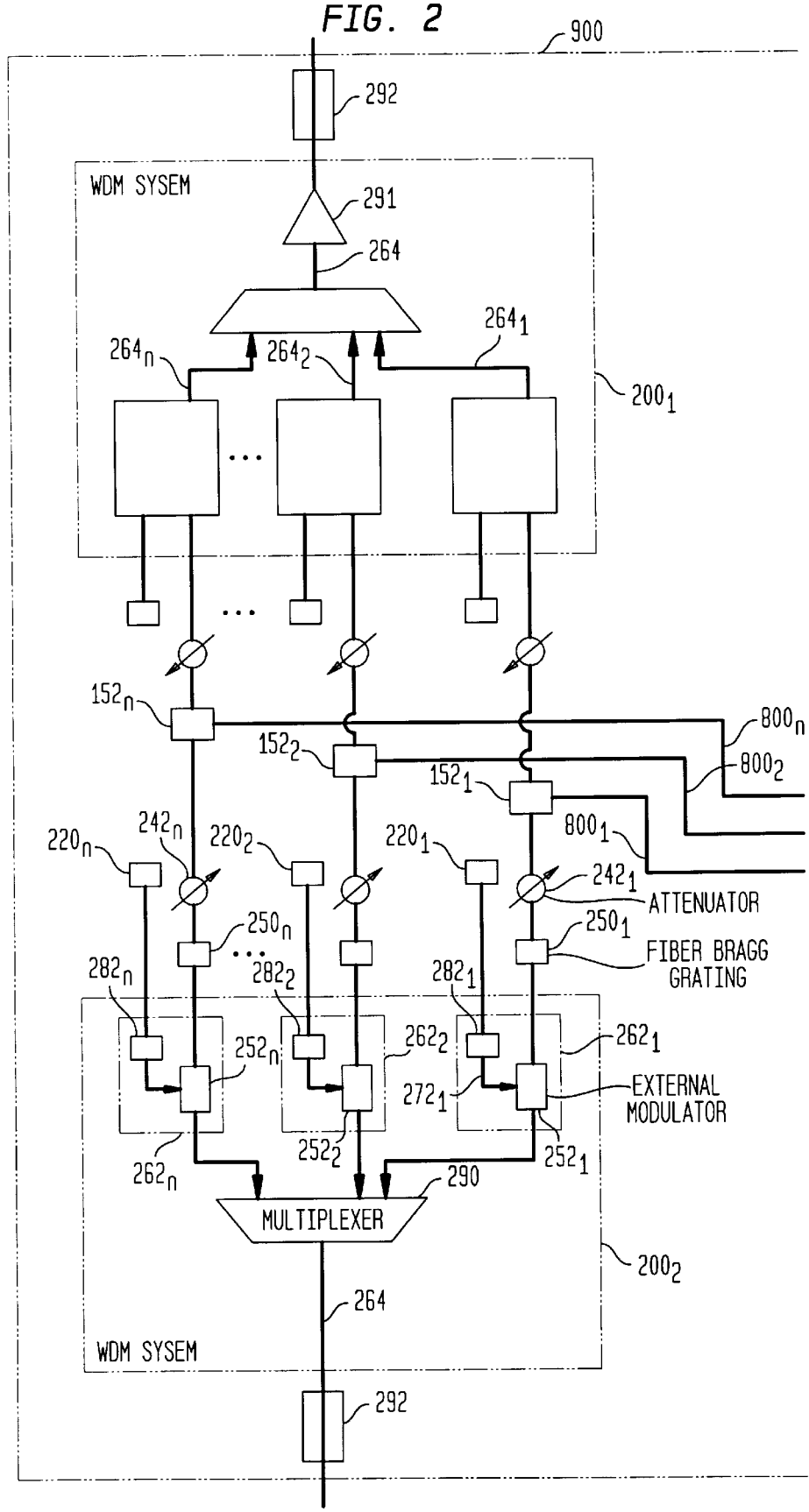

As can also be seen by placing FIG. 1 and FIG. 2 adjacent to each other, the signals egressing bank 100 may be coupled, as described above, to three additional collocated WDM systems $200_1$, $200_2$, and $200_4$. Although FIGS. 1 and 2 depict only four collocated WDM systems 200, my invention is not limited to four WDM systems. In fact, FIG. 1 illustratively allows for connection of one of the outputs of splitters 154 to other collocated WDM systems. The number of WDM systems that can be supported by laser diodes 101 is limited by the power output of laser diodes 101. It is known in the prior art that reliable operation of WDM systems 200 require the output power of the transponder 263 to be between approximately −5.5 dBm and −3.5 dBm, 0.3 $10^{-3}$ Watts or 0.3 mW and 0.4 mW respectively. Thus, what is needed is a laser diode 101 with high enough power to compensate for coupling losses at splitters 151 and 153 and transponders 263. With respect to transponder 263 the only appreciable losses that signals 800 will encounter are at the modulators 253; all other losses encountered in the WDM system 200 are expected to be negligible. For example, an external modulator 253 with an insertion loss of 3.3 dB for signals 800 is typical and available in the art. Thus, the power level of signal 800 has to be between −2.2 dBm (0.6 mW) and −0.2 dBm (0.95 mW) at the input of transponder 263. Thus, assuming 50/50 splitters 151 and 153 having negligible insertion loss and an input power of 0 dBm (1 mW) at the transponder 263, a laser diode 101 with an output power of 13 dBm (20 mW) can support up to twenty collocated WDM systems 200. Optical splitters 150 are available in the art which provide 0.2 dB insertion loss or less for signals 800. If we assume that the splitters have insertion losses of 0.2 dB and an input power requirement of 0 dBm (1 mW) at the transponder 263, then a laser diode 101 with an output power of 13 dBm (20 mW) would be able to support up to ten collocated WDM systems 200 by using 90/10 splitters. A laser bank 100 serving ten collocated WDM systems 200 would result in tremendous cost savings over the prior art. For example, whereas in the prior art ten WDM systems having the capacity for forty channels would require four hundred laser diodes a system designed in accordance with my invention requires only forty laser diodes. Furthermore, transponder 263 is a generic transponder which can be used with any of the forty channels or wavelengths 800.

Furthermore, as technology advances the insertion loss of transponders will go down thereby allowing even more collocated WDM systems implemented in accordance with my invention to support by a single bank 100. Moreover, even greater cost savings may be realized by the use of solid state lasers in place of laser diodes 101. For example, laser diodes 101 may be replaced with a frequency doubled Neodymium:Yttrium Aluminum Garnet (Nd:YAG) lasers. Nd:YAG lasers are known in the art for generating up to 30 dBm (1,000 mW) of power. Thus, a bank 100 having Nd:YAG lasers 101 would be capable of supporting up to one thousand collocated WDM systems thereby resulting in only a single bank 100 per location resulting in even greater cost savings.

In accordance with another aspect of my invention the power amplifier 291 may be eliminated through the use of a high power laser at bank 100, for example a Nd:YAG laser previously described above, as illustratively shown by WDM system $200_2$ in FIG. 2. In this aspect of my invention larger amounts of power, than the minimum required, is coupled to external modulator 252, eliminating the need for power amplifier 291. A WDM system designed in accordance with this aspect of my invention would not only eliminate the cost of the amplifier, but would also result in an improved signal ratio for the output signal on lead 264. The improvement in signal to noise ratio will allow for transmittal over longer distances. Note, however, that a WDM system $200_2$ designed in accordance with this aspect of my invention advantageously employs filters or fiber Bragg gratings $250_1$ prior to the optical signal being applied to transponder $262_1$ in system $200_2$. Fiber Bragg gratings are needed to filter out any stimulated Brillouin scattering that may occur as a result of coupling higher power levels into the fiber used for connecting bank 100 to WDM system $200_2$.

Again with reference to FIG. 2 and in accordance with this aspect of my invention, that portion of the signal $800_1$ coupled from splitter $152_1$ and intended for WDM system $200_2$ is first equalized by attenuator $242_1$. The signal $800_1$ from 242, is then coupled to fiber Bragg grating $250_1$ where any stimulated Brillouin scattering that may have occurred is filtered. The filtered signal $800_1$ is next coupled to external modulator $252_1$ which modulates the signal $800_1$ resulting in a transposed optical signal $264_1$. Transposed signal $264_1$ is then wave division multiplexed by wavelength multiplexer 290. Note here, however, the multiplexed signal 264 is coupled directly onto output fiber 292 without any intervening amplification.

Turning back to FIG. 1, and specifically focusing on WDM system $200_4$, there is illustrated yet another aspect of my invention. A system designed in accordance with this aspect of my invention would advantageously distribute the laser signals 800 egressing bank 100 to a low speed transmitter $430_1$ residing on a collocated low speed system, such as a SONET transport system. Placing the external modulator $454_1$ on the low speed transmitter $430_1$ is known in the art. However, wavelength division multiplex systems having the transponder residing on the low speed transmitter suffer from the drawback that each low speed channel has to have dedicated to it a laser source. In addition, the SONET or other wavelength sources must match the operating wavelengths and stability requirements of the target WDM system, thus replicating the original transponder inventory problem. Moreover, this approach has required that such SONET or other low speed transmitters be from the same supplier as the WDM system. In accordance with this aspect of my invention, laser signals 800 egressing bank 100 are coupled to a low speed transmitters 430 having external modulators 454. Specifically, signal $800_1$ is coupled through splitters $150_1$, $153_1$ and $154_1$ to the external modulator $454_1$ residing on low speed transmitter $430_1$. An electrical signal $474_1$ is derived directly from the electrical transmitter $484_1$ also residing on low speed transmitter $430_1$. The electrical signal $474_1$, for example, may be a SONET STS-48 signal. The electrical input signal $474_1$ is coupled to the modulator $454_1$ and phase modulates laser signal 800 as laser signal 800 traverses modulator $454_1$. Modulator $454_1$ may be a lithium niobate modulator or other external modulator known in the art. A WDM system designed in accordance with this aspect of my invention results in a transponder $470_1$ having only an attenuator $445_1$ connected between modulator $454_1$ and multiplexer 290 to compensate for the uneven gain curve of amplifier 291. The output of transponder $470_1$ is signal $464_1$ which is the wavelength transposed representation of the optical signal transmitted by low speed input $430_1$. Signal $464_1$ is transmitted to wavelength division multiplexer 290 where it is spectrally combined with the signals $464_2$ through $464_n$ received from transponders $470_2$ through $470_n$, each signal 464 representing a different low speed input 430 and channel 800 in a WDM system. Signal 464 is applied to an optical fiber amplifier 291 and coupled onto output fiber 292. A WDM system 200 designed in accordance with this aspect of my invention also derives tremendous cost savings. These savings are again realized by use of a centralized laser bank 100 resulting in the same lasers supporting a plurality of WDM systems 200.

Those skilled in art will note that neither the collocated systems 200 nor the laser banks 100 deployed in accordance with my invention need not come from the same supplier. For example, in accordance with my invention different system suppliers would each be able to design a system 200 once the characteristics of the laser diodes 101 are disclosed. For example, in accordance with the channel grid set forth in ITU Draft Recommendation G.629 the location and spacing wavelength would be known and standardized. A system 200 supplier would then be able to interwork with a different laser bank 100 supplier whose laser diodes 101 was within the specifications required by the system 200.

The above description is exemplary of my invention. Numerous modifications and variations may be made by those skilled in the art without departing from the scope and spirit of my invention.

What is claimed is:

1. A combination for distribution of optical carrier beams used as channels in plural wavelength division multiplex systems, said combination comprising:

a plurality of laser sources each having a distinct carrier beam wavelength;

a plurality of wavelength division multiplex systems, said systems each having a plurality of transponders, a plurality of input channels, and a single output;

a plurality of optical splitters for dividing and coupling each of said distinct carrier beams to a corresponding transponder so that each of such transponders in each wavelength division multiplex system is assigned a unique wavelength; and a plurality of modulators connected to said transponders for transposing each input channel to one of said assigned wavelengths.

2. The combination in accordance with claim 1 wherein each said wavelength division multiplex system includes an optical multiplexer for combining the transposed input channels for connection to the single output of the wavelength division multiplex system.

3. The combination in accordance with claim 2 further including an amplifier connected in each wavelength multiplex system between said optical multiplexer and said single output.

4. The combination in accordance with claim 3 wherein said wavelength multiplex systems are collocated.

5. The combination in accordance with claim 4 wherein said laser sources are laser diodes.

6. The combination in accordance with claim 2 wherein said laser sources are solid state lasers.

7. The combination in accordance with claim 1 wherein each of said transponders includes one of said modulators.

8. The combination in accordance with claim 1 where each said modulator is connected between one of said optical splitters and one of said transponders.

9. In combination, a plurality of laser sources each having a distinct optical carrier beam wavelength, a plurality of wavelength division multiplex systems each having a plurality of transponders, a plurality of inputs, and a single output;

a plurality of optical channels;

a plurality of first optical splitters each connected to one of said lasers and one of said optical channels;

a plurality of second optical splitters each connected between one of said optical channels and one of said transponders;

a modulator for each of said transponders and connected to one of said second optical splitters; and means connecting the output of each of said modulators in each of said wavelength division multiplex systems to said one output for said each system.

10. The combination in accordance with claim 9 wherein said means connecting said outputs of said modulators to said one output for said each system includes a multiplexer to which each said modulator in a system is connected and a common output amplifier.

11. The combination in accordance with claim 10, further comprising an attenuator between each said second optical splitter and said one of said transponders.

12. The combination in accordance with claim 10, further comprising an attenuator between each of said modulators and said multiplexer in each of said systems.

13. The combination in accordance with claim 10 wherein each of said system is a wavelength division multiplex system.

14. The combination in accordance with claim 11 further comprising a fiber Bragg grating connected between each of said attenuator and said one of said transponders.

15. The combination in accordance with claim 10 wherein said laser sources are laser diodes.

16. The combination in accordance with claim 10 wherein said laser sources are solid state lasers.

17. A method for centralized distribution of individually unique wavelength optical carrier beams to collocated wavelength division multiplex systems, each said system having a plurality of transponders, said method comprising:

splitting each optical carrier beam into a plurality of beams and applying individual of said plurality of optical carrier beams to individual ones of said transponders in said wavelength division multiplex systems;

modulating said plurality of optical carrier beams each with an input signal applied thereto; and in each system, multiplexing the modulated optical carrier beams from the transponders of said each system.

18. The method in accordance with claim 17, further comprising amplifying the output from the multiplexer and applying the output to an individual fiber from the system.

19. The method in accordance with claim 17, further comprising attenuating said optical carrier beams before modulating said beams with said input signals.

20. The method in accordance with claim 18, further comprising attenuating the outputs from the modulators before multiplexing the outputs.

* * * * *